(12) United States Patent
Hamzy

(10) Patent No.: US 6,604,111 B1
(45) Date of Patent: Aug. 5, 2003

(54) METHOD AND SYSTEM FOR SPOOLING VIRTUAL MACHINE DATA-PRESENTATION JOBS VIA CREATION OF AN EXECUTABLE FILE

(75) Inventor: Mark Joseph Hamzy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/213,617

(22) Filed: Dec. 17, 1998

(51) Int. Cl.$^7$ .............................................. G06F 17/30
(52) U.S. Cl. ..................... 707/103; 707/102; 707/104.1; 358/1.9
(58) Field of Search ............................... 358/1.14, 1.15, 358/1.9; 717/9; 705/35; 710/1; 428/328; 707/103, 102, 104.1

(56) References Cited

U.S. PATENT DOCUMENTS

| | | | | |
|---|---|---|---|---|
| 5,859,711 A | * | 1/1999 | Barry et al. ................. | 358/296 |
| 5,895,711 A | * | 4/1999 | Yamaki et al. ............... | 428/328 |
| 6,003,065 A | * | 12/1999 | Yan et al. .................... | 709/201 |
| 6,006,281 A | * | 12/1999 | Edmunds ....................... | 710/1 |
| 6,031,623 A | * | 2/2000 | Smith et al. ................ | 358/1.14 |
| 6,085,120 A | * | 7/2000 | Schwerdtfeger et al. ...... | 700/90 |
| 6,170,083 B1 | * | 1/2001 | Adl-Tabatabai ................ | 717/9 |
| 6,201,611 B1 | * | 3/2001 | Carter et al. ............... | 358/1.15 |
| 6,289,320 B1 | * | 9/2001 | Drummond et al. .......... | 705/35 |
| 6,295,538 B1 | * | 9/2001 | Cooper et al. ............... | 707/104 |

OTHER PUBLICATIONS

Weber, Joe; Using Java 1.1, Third Edition; 1997; pp. 993–1014.

Morehouse, Scott; Re: Concerns—Printing; May 1, 1997; p.1.

Piet Jonas; The JavaMetaFile Documentation; Jan. 5, 1997; pp. 1–15.

* cited by examiner

Primary Examiner—Charles L. Rones
(74) Attorney, Agent, or Firm—Duke W. Yee; Jeffrey S. LaBaw; Stephen R. Tkacs

(57) ABSTRACT

A data-presentation job is spooled using a virtual machine, such as a Java virtual machine, in a data processing system. Data-presentation may include static data-presentation, such as printed output, and dynamic data-presentation, such as displaying on a display device. After a user issues a data-presentation job request, such as a print job request, all of the issuing application's method calls, such as Abstract Windowing Toolkit calls, are recorded as executable code, such a Java source code statements. An executable data-presentation job file, such as a Java .class file, is then generated, for example, by compiling the Java source code statements. The Java .class file may then be executed within a Java virtual machine to reproduce the desired data-presentation output.

24 Claims, 12 Drawing Sheets

EXAMPLE OF A SIMPLE JAVA APPLICATION THAT PRINTS

```java
import java.awt.*;
import java.util.*;

public class SamplePrint extends Frame
{
    public SamplePrint ()
    {
        Toolkit      t     = getToolkit ();
        Properties   props = new Properties ();
        PrintJob     pjob  = t.getPrintJob (this,
                                    this.getClass ().getName (),
                                    props);

Graphics g;
        g = pjob.getGraphics ();
        if (null !=g)
        {
            Dimension d;
            d = pjob.getPageDimension ();

drawStuff (g, d);

g.dispose ();            //flush page
        } pjob.end ();
    }
    void drawStuff (Graphics g, Dimension d)
    {
        int    cx;
        int    cy;
        cx = d.width - 1;
        cy = d.height - 1;

//Note: Here is where all of the graphical AWT calls are made for the print job
        g.setColor (Color.black);
        g.drawRect (0, 0, cx, cy):
    }
}
class SamplePrintTester extends Frame
{
    public SamplePrintTester ()
    {
        SamplePrint sp = new SamplePrint ();
    }
    public static void main (String[] args)
    {
        SamplePrintTester spt = new SamplePrintTester ();
        System.exit (0);
    }
}
```

FIG. 7

EXAMPLE OF INTERMEDIATE FILE BEFORE COMPLETION

```java
// * begin header * import java.awt.*;
import java.awt.event.*;

class SpooledPrintJob
{
        public void draw (Graphics g)
        {
                // * end header * g.setColor (Color.black);
                g.drawRect (0, 0, cx, cy);

// *** begin footer ***
        }
}

//The remainder of the footer is optional for setting up a viewer if the output device
is a display.

class SpooledPrintJobTester extends Frame
{
        public SpooledPrintJobTester ()
        {
           spj_d = new SpooledPrintJob ();

//Add an anonymous window close event handler
           addWindowListener (new WindowAdapter ()
           {
                public void windowClosing (WindowEvent e)
                {
                        System.exit (0);
                }
           });

//Set the window size
           setSize (300, 200);

//Set the title bar string
           setTitle (getClass ().getName ());
```

FROM FIG. 9A

```
        //Add a client window (that we can easily calculate the size of)
        clientWindow_d = new ClientCanvas ();
        add (clientWindow_d, "Center");
    }
    public static void main (String [] args)
    {
            SpooledPrintJobTester spjt = new SpooledPrintJobTester ();
            spjt.show ();
    }
}
    /**
    *This is a local class that is for the client "window." The client
    *window is a Canvas. This contains subclassed operations on that
    *Canvas class.
    */
class ClientCanvas extends Canvas
{
    /**
       *This is called when the window needs to be drawn into.
       *
       *@param g The graphics instance class.
    */
    public void paint (Graphics g)
    {
            if (null !=spj_d)
                    spj_d.draw (g)l;
        }
    } protected SpooledPrintJob spj_d       = null;
    protected Canvas          clientWindow_d = null;
}
// *** end footer ***
```

FIG. 9B

EXAMPLE OF JAVA CALLS THAT MAY BE OUTPUTTED TO
AN EXECUTABLE PRINT JOB FILE OR .CLASS FILE clearRect(int, int, int, int)
    Clears the specified rectangle by filling it with the background color of the current drawing surface.
clipRoot(int, int, int, int)
    Intersects the current clip with the specified rectangle.
copyArea(int, int, int, int, int, int)
    Copies an area of the component by a distance specified by dx and dy.
draw3Drect(int, int, int, int, int, boolean)
    Draws a 3-D highlighted outline of the specified rectangle.
drawArc(int, int, int, int, int, int)
    Draws the outline of a circular or elliptical Arc covering the specified rectangle.
drawBytes(byte[], int, int, int, int)
    Draws the text given by the specified byte array, using this graphics context's current font and color.
drawChars(char[], int, int, int, int)
    Draws text given by the specified character array, using this graphics context's current font and color.
drawImage(Image, int, int, Color, ImageObserver)
    Draws as much of the specified image as is currently available.
drawImage(Image, int, int, ImageObserver)
    Draws as much of the specified image as is currently available.
drawImage(Image, int, int, int, int, Color, ImageObserver)
    Draws as much of the specified image as has already been scaled to fit inside the specified rectangle.
drawImage(Image, int, int, int, int, ImageObserver)
    Draws as much of the specified image as has already been scaled to fit inside the specified rectangle.
drawImage(Image, int, int, int, int, int, int, int, int, Color, ImageObserver)
    Draws as much of the specified area of the specified image as is currently available, scaling it on-the-fly to fit inside the specified area of the destination drawable surface.
drawImage(Image, int, int, int, int, int, int, int, int, ImageObserver)
    Draws as much of the specified area of the specified image as is currently available, scaling it on-the-fly to fit inside the specified area of the destination drawable surface.

EXAMPLES OF JAVA CALLS THAT MAY BE OUTPUTTED TO
AN EXECUTABLE PRINT JOB FILE OR .CLASS FILE drawLine(int, int, int, int)
 Draws a line using the current color between points (x1, y1) and (x2, y2) in this graphics context's coordinate system.
drawOval(int, int, int, int)
 Draws the outline of an oval.
drawPolygon(int[], int[], int)
 Draws a closed polygon defined by arrays of x and y coordinates.
drawPolygon(Polygon)
 Draws the outline of a polygon defined by the specified Polygon object.
drawPolyline(int[], int[], int)
 Draws a sequence of connected lines defined by arrays of x and y coordinates.
drawRect(int, int, int, int)
 Draws the outline of the specified rectangle.
drawRoundRect(int, int, int, int, int, int)
 Draws an outlined round-cornered rectangle using this graphics context's current color.
Drawstring(String, int, int)
 Draws the text given by the specified string, using this graphics context's current font and color.
fill3DRect(int, int, int, int, boolean)
 Paints a 3-D highlighted rectangle filled with the current color.
fillArc(int, int, int, int, int, int)
 Fills a circular or elliptical arc covering the specified rectangle.
fillOval(int, int, int, int)
 Fills an oval bounded by the specified rectangle with the current color.
fillPolygon(int[], int [], int)
 Fills a closed polygon defined by arrays of x and y coordinates.
fillPolygon(Polygon)
 Fills the polygon defined by the specified Polygon object with the graphics context's current color.
fillRect(int, int, int, int)
 Fills the specified rectangle.
fillRoundRect(int, int, int, int, int, int)
 Fills the specified rounded corner rectangle with the current color.

PSEUDOCODE FOR RECEIPT AND EXECUTION
OF EXECUTABLE PRINT JOB FILE

//Receive print job class file

//Load print job class file into JVM's class space
```
    ClassLoader cl;
    Class       c;
    try
    {
            c = cl.loadClass ("SpooledPrintJob");
    }
    catch (Exception e)
    {
    }
```

//Create a new instance of the class file with newInstance ()
```
    class c;
    Object c;
    try
    {
            o = c.newInstance ();
    }
    catch (Exception e)
    {
    }
```

//Submit print job with the following code snipplet:
```
    public SubmitPrintJob (Object o)
    {
            ToolKit     t       = getToolKit ();
            Properties  props   = new Properties ();
            PrintJob    pjob    = t.getPrintJob (this,
                                        this.getClass ().getName (),
                                        props);

Graphics g;
            g = pjob.getGraphics ();
            if (null != g)
            {
                callPrintJob (o, g);

g.dispose ();      // flush page
            }
            pjob.end ();
    }
```

*FIG. 12A*

PSEUDOCODE FOR RECEIPT AND EXECUTION
OF EXECUTABLE PRINT JOB FILE

```
public callPrintJob (Object o, Graphics g)
{
        class []         paramTypes;
        Object[]         paramArgs;
        Method           method;

paramArgs = new Object [] { g };
        method = findMethod(o, "draw");

try
        {
                method.invoke (o, paramArgs);
        }
        catch (Exception e)
        {
        }
}
private Method findMethod (Object o, String szMethodName)
{
        Method    method;
        Class     o         = o.getClass ();
        Method[]  theMethods = o.getMethods ();

for (int i = 0; i < theMethods.length; i++)
        {
                method = theMethods[i];
                String methodString = method.getName ();

if (methodString.equals (szMethodName))
                {
                        // success!
                        return method;
                }
        }

// Failure;
        return null;
}
```

*FIG. 12B*

METHOD AND SYSTEM FOR SPOOLING VIRTUAL MACHINE DATA-PRESENTATION JOBS VIA CREATION OF AN EXECUTABLE FILE

BACKGROUND OF THE INVENTION

1. Technical Field

The present invention relates generally to an improved data processing system and, in particular, to a method and system for improving the performance of data-presentation within a data processing system, whether the output form of the data-presentation is static, such as printing, or dynamic, such as displaying.

2. Description of Related Art

Some computer users are more familiar than others with the scalability and variability of computer resources. Graphics capability is one consideration of computer resources with which most users are familiar. Many users understand that printers can be fast or slow and that this speed varies for several reasons, most notably, time versus complexity. For example, complex graphics may require more time to generate. In general, users desire increasingly higher quality graphical output in decreasing amounts of time, and much effort in the computer industry is spent trying to achieve this goal. However, the solutions may be rather complex and inflexible, i.e., non-portable.

Data-presentation jobs are generally completed by either having an application send output-device-specific data directly to the output device while waiting for the output device to accept the data, or spooling the data to disk or memory for subsequent transfer to an output device. One spooling format is a binary data stream that is output-device-specific and often very large. The data stream may consist of bitmaps, data values, and output-device-specific language commands.

Since a large file may require a long time to transmit to a printer, whether connected to a stand-alone machine or located on a network, another spooling format can be used. This format is a recording of the parameters to application programming interface (API) calls that were made during the creation of the data-presentation job. For example, this format is a called a metafile in the OS/2 operating system, available from International Business Machines, Inc. A metafile contains metadata, which is data that describes other data. In an OS/2 metafile, the data values in the file are not binary values of graphical object representations, but represent graphical objects that may be created when the data values are used as parameters or inputs to API's that are able to create and present the graphical objects.

In order for the graphical objects in a metafile to be generated, a backend subsystem must read one set of metadata in the metafile at a time, interpret the metadata to determine the identity of the API's to be invoked for the particular set of metadata, and invoke the proper API's with the metadata. Once the graphical objects are rendered in a presentation space, the backend subsystem may send the presentation space to an output device as output device-specific data. The backend subsystem's interpretive process may be slow. Obviously, the backend subsystem of this method is platform-specific and/or output-device-specific, and hence, non-portable.

Virtual machine platforms are a new and evolving computing platform with Java being the most prevalent of these platforms. One of the most touted features of Java is its portability. With the "write once, run anywhere" concept, it is envisioned that a Java application or applet could run on a mainframe computer, and without modification, also run on a hand-held device, a Personal Digital Assistant (PDA), a printer, or some other output device. Obviously, a PDA and a mainframe computer have widely varying computing resources. A Java virtual machine (JVM) running on each of these platforms may have widely varying amounts of memory or bandwidth at its disposal, and a properly designed JVM should take advantage of the available resources while accomplishing the goal of portability. In order to achieve these goals with respect to data-presentation processing, it is desirable to have a design of a JVM that addresses the common problems of performance and portability.

SUMMARY OF THE INVENTION

A data-presentation job is spooled using a virtual machine, such as a Java virtual machine, in a data processing system. Data-presentation may include static data-presentation and dynamic data-presentation. After a user issues a data-presentation job request, such as a print job request, all of the issuing application's method calls are recorded as executable code. An executable data-presentation job file is then generated. An example of the executable data-presentation job file would be a Java .class file. The executable data-presentation job file may then be executed within a Java virtual machine to reproduce the desired data-presentation output.

BRIEF DESCRIPTION OF THE DRAWINGS

The novel features believed characteristic of the invention a re set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a sample Java program that illustrates a Java application that outputs data through data-presentation and includes AWT calls;

FIG. 9 is an example of an intermediate Java source code file;

FIGS. 10A and 10B are examples of AWT calls that may be outputted in the executable data-presentation job file generated in response to a user data-presentation job request;

FIGS. 12A and 12B are an example of the control flow and pseudocode of software components that may reside in a virtual machine that receives an executable data-presentation file.

DETAILED DESCRIPTION OF THE PREFERRED EMBODIMENT

Figure 1:
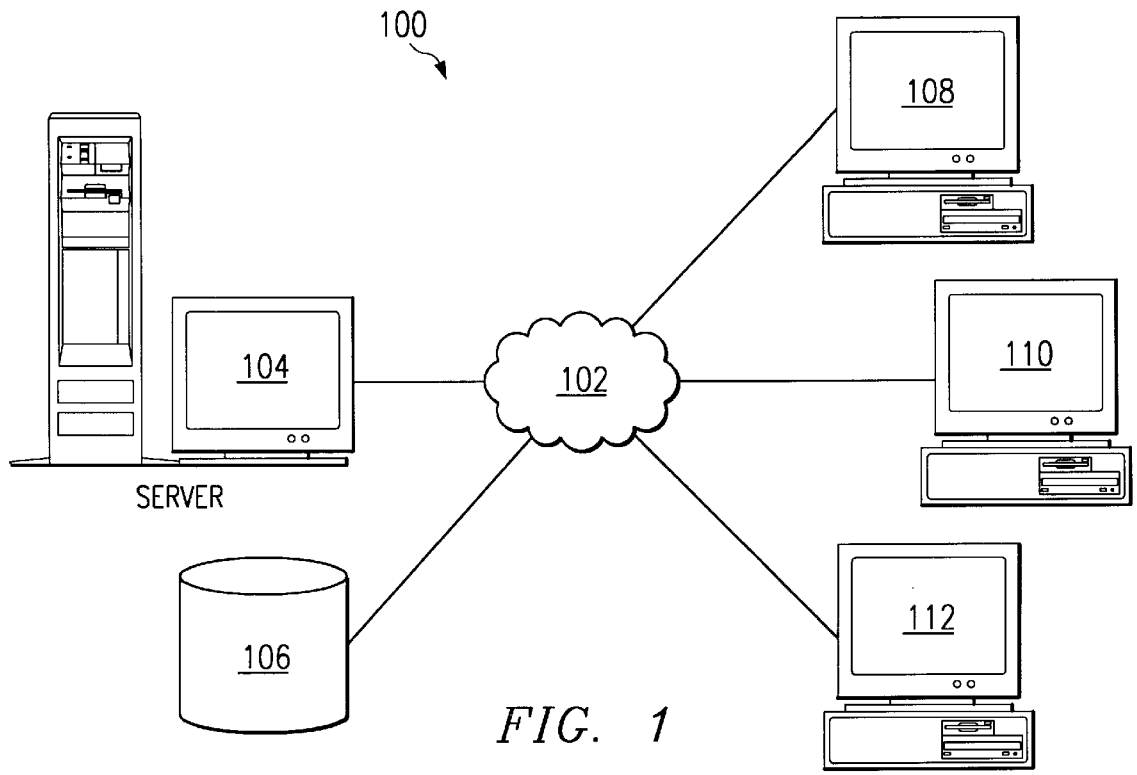
FIG. 1 depicts a pictorial representation of a distributed data processing system in which the present invention may be implemented.

With reference now to the figures, FIG. 1 depicts a pictorial representation of a distributed data processing system in which the present invention may be implemented.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
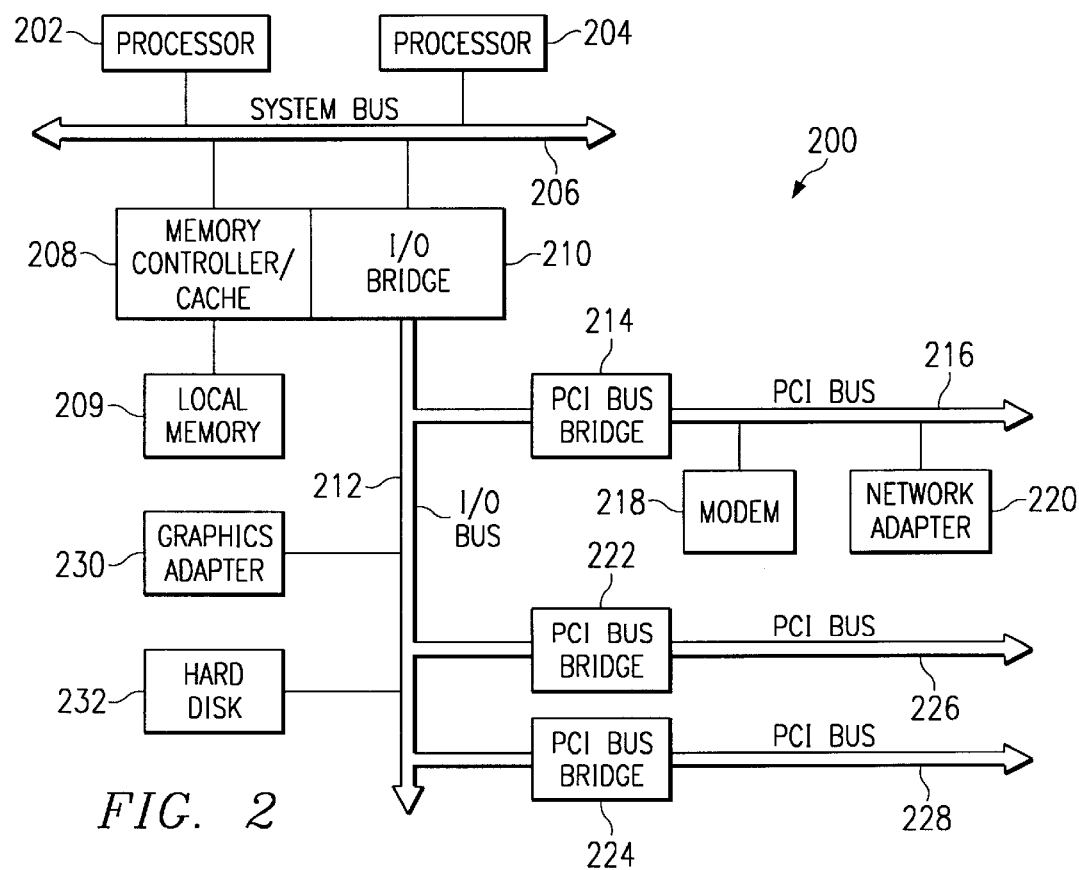
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
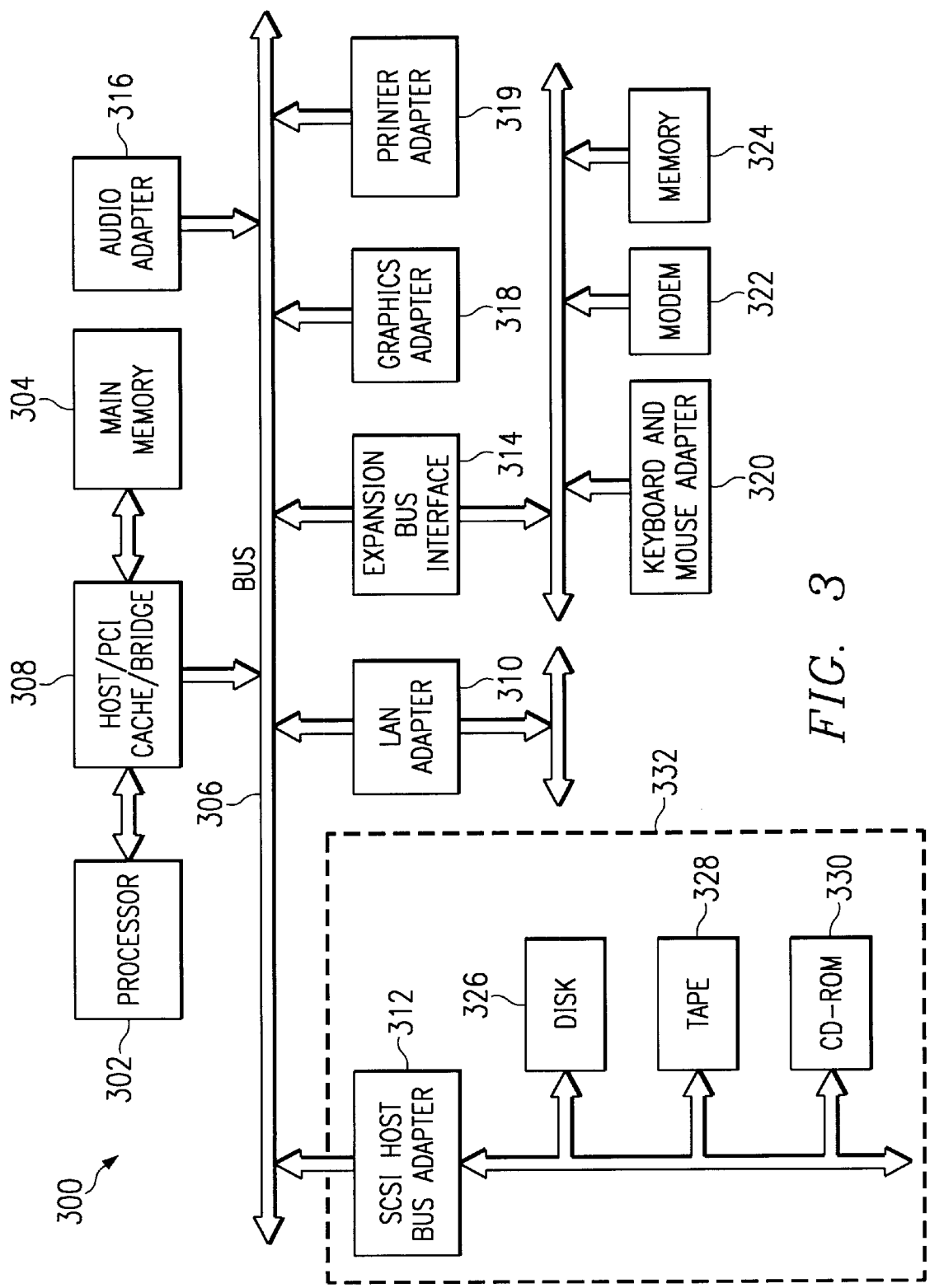
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and printer adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown) and through printer adapter 319 to a printer (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Although FIGS. 1–3 provide examples of configurations of computer systems on which the present invention may execute, the following background information may provide a context for understanding the overall computing environment in which the present invention, as described in FIGS. 4–20, may be used.

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society. Providing informational guides and/or searchable databases of online public records may reduce operating costs.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language called the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information. A browser is a program capable of submitting a request for information identified by a URL at the client machine. Retrieval of information on the Web is generally accomplished with an HTML-compatible browser. The Internet also is widely used to transfer applications to users using browsers.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized through the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time environment. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on-the-fly into native machine code.

A development environment, such as the Java Development Kit (JDK), available from Sun Microsystems, Inc., may be used to build Java byte code from Java language source code and libraries. This Java byte code may be stored as a Java application or applet on a Web Server where it can be downloaded over a network to a user's machine and executed on a local JVM.

The Java run-time environment is specifically designed to limit the harm that a Java application can cause to the system that it is running on. This is especially important with the World Wide Web, where Java applets are downloaded and executed automatically when a user visits a Web page that contains Java applets. Normally one would not want to execute random programs. They might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages, such as C, it is much easier to write a pair of programs, one executing locally on the user's computer that is handling the user-interaction, and the other executing remotely on a server, which is performing potentially more sophisticated and processor-intensive work.

While the Java language is designed to be platform-independent, and to execute primarily in a secure environment, programmers can extend Java applications through the use of compiled native binary code on the host operating system using C-style calling conventions through the Java Native Interface (JNI). In this fashion, a Java application can have complete access to the host operating system, including reading and writing to attached I/O devices, memory, printers, etc. Because of this, Java programs can accomplish tasks that are not normally allowed via the JVM at the cost of being platform-specific. However, with a well-designed architecture, a Java language programmer can cleanly isolate the platform-independent portion, and present a clean, platform-independent object API to other Java components while at the same time accomplishing platform-specific tasks.

Every Java virtual machine contains the Abstract Windowing Toolkit (AWT). This toolkit contains primitives for basic windowing functionality. These primitives include such user-interface functionality as window and dialog box manipulation, text rendering, buttons, check box, and radio button creation and manipulation, as well as graphics primitives such as line drawing, color choice, etc. Virtually all of the sophisticated graphics and user-interface tools are built on top of these AWT primitives.

The Java Foundation Classes (JFC) is a package containing (among other things) primitives for windowing functionality that provide a rich superset of the AWT. These primitives, or components, include everything that the AWT provides, for example, buttons, check boxes, etc., along with a rich set of new primitives, including tree views, tabbed panes, HTML text views, etc.

Figure 4:
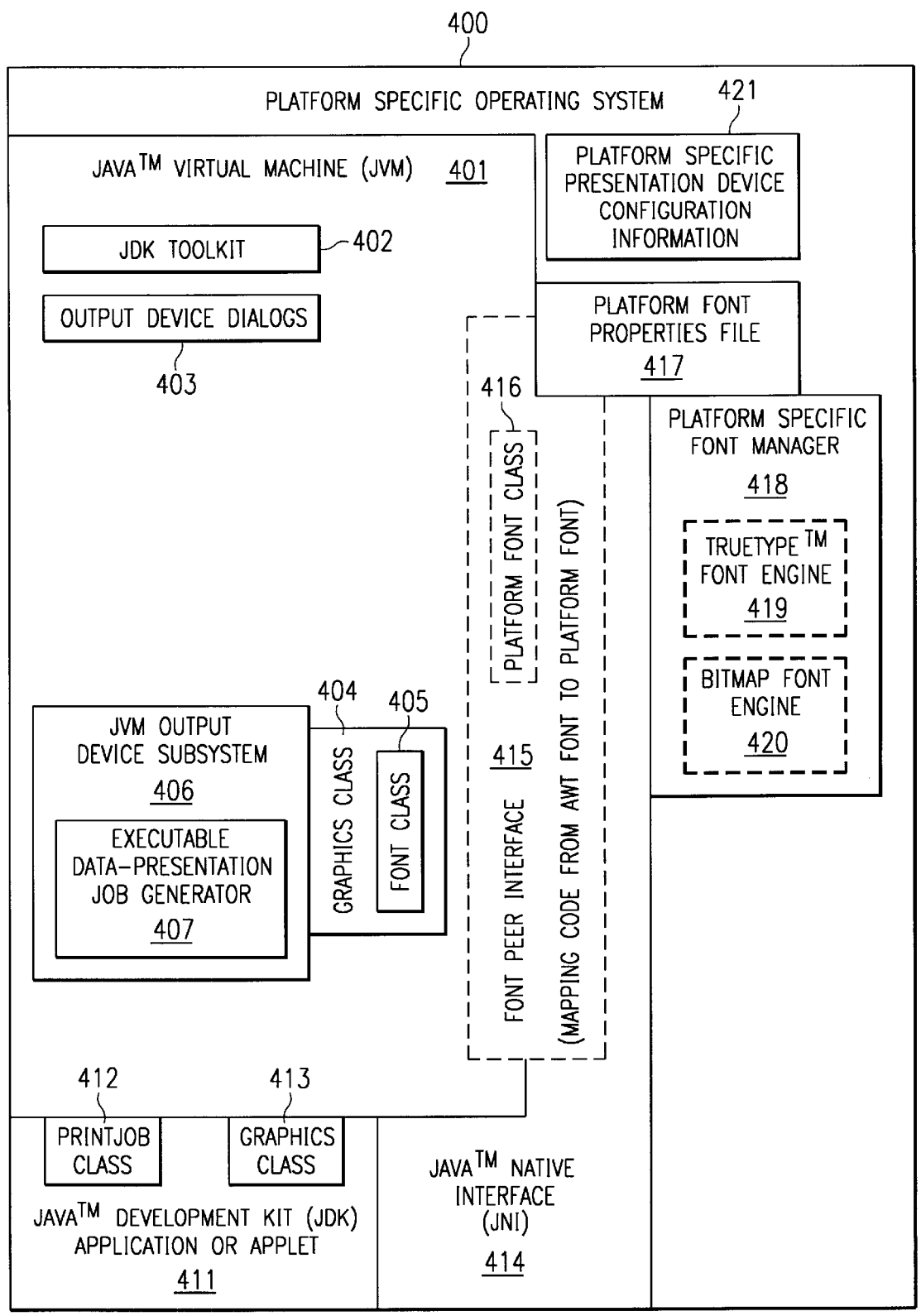
FIG. 4 is a block diagram depicting an example of a logical configuration of software components for implementing the preferred embodiment of the present invention using a virtual machine.

With reference now to FIG. 4, a block diagram depicts an example of a logical configuration of software components for implementing the preferred embodiment of the present invention. For example, these software components could be found on data processing system 300 or client 408. Java JDK application or applet 411 executes under Java Virtual Machine 401, which further executes under platform specific operating system 400. Application or applet 411 contains PrintJob Class 412 and Graphics Class 413, which enable it to perform some of the data-presentation processing. JVM 401 and the application or applet 411 share the Graphics Class 404 and Font Class 405, which provide graphics environment information and methods for various data-presentation processes. JVM 401 could be embedded within a printer device, hardcopy device, PDA, data processing system 300, etc., as a software component or as part of a virtual machine implemented on a chip.

Platform specific or host operating system 400 also includes platform specific font manager 418 that provides access to various font information through the Font Peer Interface 415, which uses the JNI 414. The depicted font manager, which shows optional TrueType® font engine 419 and optional bitmap font engine 420, is shown for exemplary purposes only as the specific configuration of a font manager could vary widely across host operating systems. Platform specific font manager 418 provides platform specific font information to Java Virtual Machine 401 through JNI 414.

Font Peer Interface 415 bridges or "peers" JVM 401 and JNI 414. Peer interfaces are well-known in the Java environment, and are generally accessible to application developers. However, unlike various classes that would be generally available to developers as part of JVM 401, such as Output Device Dialogs 403 or JDK ToolKit 402, Font Peer Interface 415 must be implemented by those who desire to port a JVM to various systems as it is platform specific. Within Font Peer Interface 415 is Platform Font Class 416, which is not publicly exposed.

Peer interfaces enable a JVM to access various information on the host platform. In this case, Font Peer Interface 415 may access information in Platform Font Properties File 417. An important function of Platform Font Class 416 is to provide method(s) as the mapping from an AWT font to a platform specific font. In so doing, the Platform Font Class 416 is the bridge through the Font Peer Interface between the JVM code and the JNI code. Each JVM must implement a Font Peer Interface-most would use a Platform Font Class in conjunction with a platform specific font properties file.

The Java run-time environment provides a list of available fonts upon request. These fonts are mapped to real fonts available from the host operating system when the JVM initializes. The font mapping is specified in a font properties file.

The Java 2D API defines a Font class that provides detailed information. The information that describes a font, such as its name and style parameters, is contained in Font attributes and in FontFeature objects. Every Font object contains an array of FontFeatures describing the particular font, as well as attributes for font name, size, and transform. The Font class defines several convenient methods that allow the application to access this data directly. The Font class also provides access to font metrics, as every Font object contains the detailed metrics for the font.

Within JVM 401 is JVM Output Device Subsystem 406, which is an example of a logical grouping of JVM components which provide some of the data-presentation processing. Executable Data-Presentation Job Generator 407 within JVM Output Device Subsystem 406 generates an executable data-presentation job file comprising calls to AWT methods.

The flowcharts in the figures depict the flow of control between various portions of software components shown in FIG. 4. The depicted flowcharts are meant merely to provide an example of the flow of control through various method calls and other portions of software code from an initial user action to the final output of presentation data. The flowcharts should not be interpreted as providing all details concerning subroutine or function calls between various portions of software code nor should they be interpreted as a complete control flow diagram of all aspects of the present invention. One of ordinary skill in the art would understand that only some of the many steps concerning the software execution for flow of control between the various components in the platform specific operating system are shown, the Java virtual machine and the JDK application or applet.

The present invention is equally applicable to a variety of static data-presentation devices, such as printer, fax machines, and other hardcopy devices, and dynamic data-presentation devices, such as computer displays, sound systems, etc. The present invention spools an executable data-presentation job file that may be transmitted or ported to a variety of data-presentation devices. Given the fact that the executable data-presentation job file is generated for execution within a virtual machine, and the fact that virtual machines may be embedded in widely varying computing platforms, the spooled executable data-presentation job file may be executed on a variety of computing platforms without modification and without specification at the time of generation as to the type of output device for the data-presentation process in the spooled executable data-presentation job file. The output device in most of the following examples is a printer or hardcopy device, but could be a display device or some other type of output device. In a similar manner, JVM Output Device Subsystem 406 could conceptually be JVM Print Subsystem 406. Data-presentation should not be limited to visual presentation, but may include other types of data-presentation, such as tactile, aural, oral, olfactory stimulation, etc. Hence, a print job in the following examples would be equivalent to a data-presentation job, and executable print job generator 407 would be equivalent to executable data-presentation job generator 407.

In the examples provided herein, the programming language, the virtual machine, and the form of the executable file are given as Java, a JVM, and a Java .class file. However, other virtual machines, programming languages, and executable files may be used in accomplishing the present invention.

Figure 5:
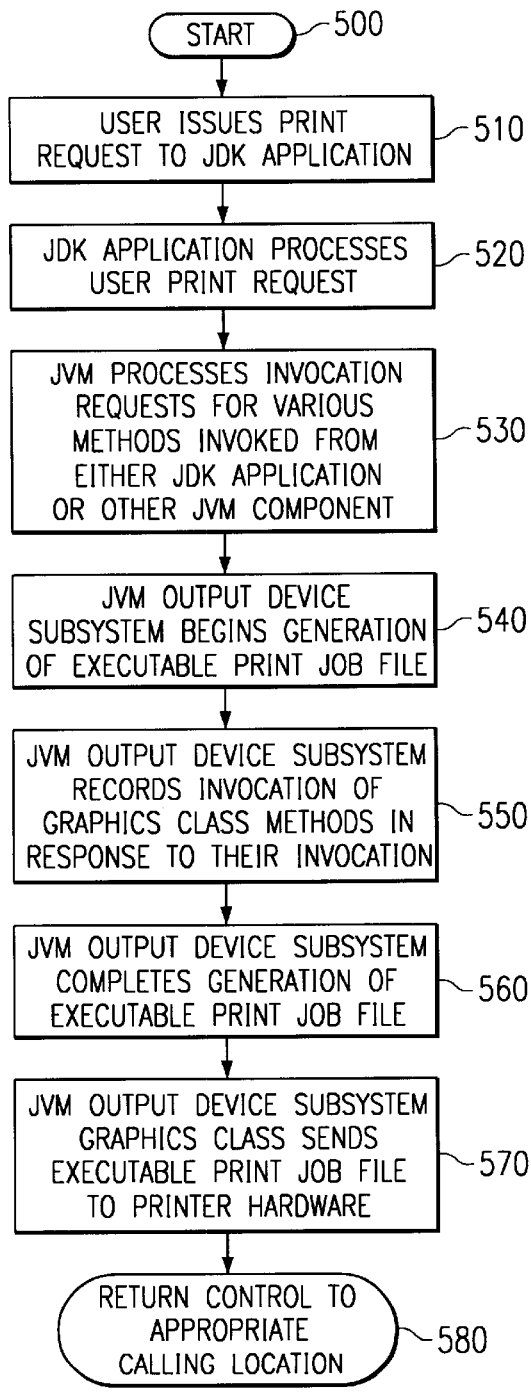
FIG. 5 is a flowchart depicting the high-level view of the control flow from a user action through the completion of a data presentation job request.

With reference now to FIG. 5, a flowchart depicts the high-level view of the control flow from a print job request to the generation of the print job from an overall JVM perspective. The process starts (step 500) when a user issues a print request to the JDK application (step 510) that processes the user print request (step 520), which is described in more detail in FIG. 6. JVM 401 processes the invocation request for various public class methods invoked from either JDK application 411 or other JVM components (step 530). These methods would include the various print-All methods, printGraphics methods, printcomponent methods, print and drawstring ( ) methods, etc.

At some point in its initial processing of the print job request, JDK application 411 invokes a getPrintJob ( ) method, PrintJob.get ( ), etc. In response, JVM Print Subsystem 406 begins the generation of the executable print job file (step 540). The JVM Print Subsystem 406 Graphics class methods and AWT calls are then recorded in response to their invocations (stew 550), which is described in more detail in FIG. 8.

At some point in its terminal processing of the print job request, JDK application 411 invokes a method equivalent to endprintjob ( ), Printjob.end ( ), etc. In response, JVM Print Subsystem 406 completes the generation of the executable print job file (step 560). The JVM Print Subsystem 406 then spools or stores the executable print job file to a printer hardware subsystem within network 102, data processing system 300, client 108, or other hardware containing a virtual machine capable of executing the spooled executable data-presentation job file (step 570). The process continues (step 580) with the return of control to the appropriate calling location.

Figure 6:
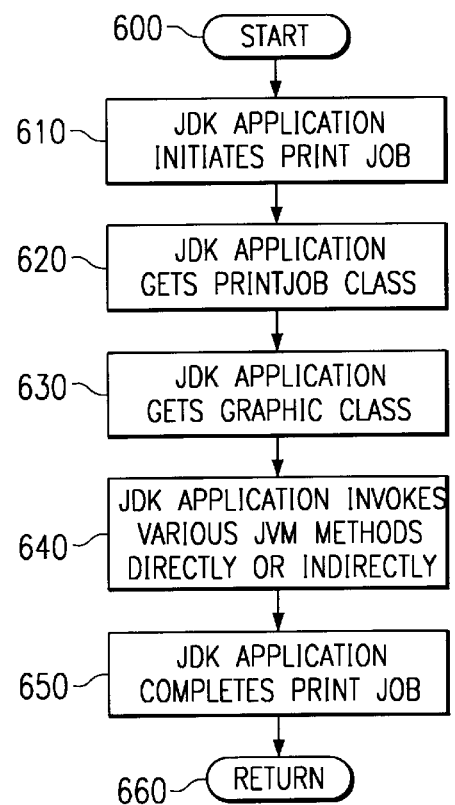
FIG. 6 is a flowchart depicting the manner in which a JDK application processes a user data presentation request.

With reference now to FIG. 6, a flowchart depicts further processing details of the manner in which the JDK application processes the user print request from the perspective of the JDK application, as discussed in step 520. Again, these steps follow a print example, but would be similar for some other generic output device. Also, the process depicted in FIG. 6 may execute in conjunction with the process shown in FIG. 5 as the process in FIG. 6 may invoke methods that are handled by the process in FIG. 5. The process starts (step 600) when JDK application 411 initiates the PrintJob (step 610). As would be understood by one of ordinary skill in the art, various Java methods must be invoked to initialize the graphics environment for subsequent function calls. These may include such things as setting the font for the graphics environment, etc. JDK application 411, for example, gets a PrintJob class (step 620). JDK application 411 then gets a Graphics class (step 630). Many of the AWT methods will use these shared instances of these classes. JDK application 411 then invokes various other JVM public methods, either directly or indirectly (step 640). JDK application 411 then completes the print job by calling the appropriate methods (step 650). The process then returns control (step 660) for other possible processing of the user print request.

In order to provide further background information on the workings of the Java environment, FIG. 7 describes the execution of JDK application 411. Applet or JDK application 411 would invoke various JVM methods, either directly or indirectly, as noted in step 640.

A JDK application (main ( ) method) or a JDK applet (run ( ) method) executes on top of an operating system's implementation of the JVM. Java programs have the ability to generate hardcopy for a user by invoking methods of a Graphics class object to draw items on hardcopy in the same manner that the methods are used to draw items on a display screen.

The JDK's toolkit class can provide a Printjob class to the application or applet. The JVM Print Subsystem provides a Graphics class, which implements all the methods that are implemented by the Abstract Windowing Toolkit's (AWT) Graphics class. This Graphics class implements the PrintGraphics interface to distinguish it from the AWT Graphics class.

In FIG. 7, a sample Java program illustrates a Java application that generates printed output and includes the calls setColor ( ) and drawRect ( ) methods. After receiving the Graphics class, the drawing primitives provided in the class can be used to generate an output page. Typically, the same primitives that are used to render the display image are used to render the hardcopy image, and these primitives can be grouped into images, text, and other drawing primitives, such as box, rectangle, circles, etc. After the page is generated, the dispose method to the Graphics class is used to dispose of the Graphics class. This process has to be repeated when doing page two, page three, . . . page n.

Figure 8:
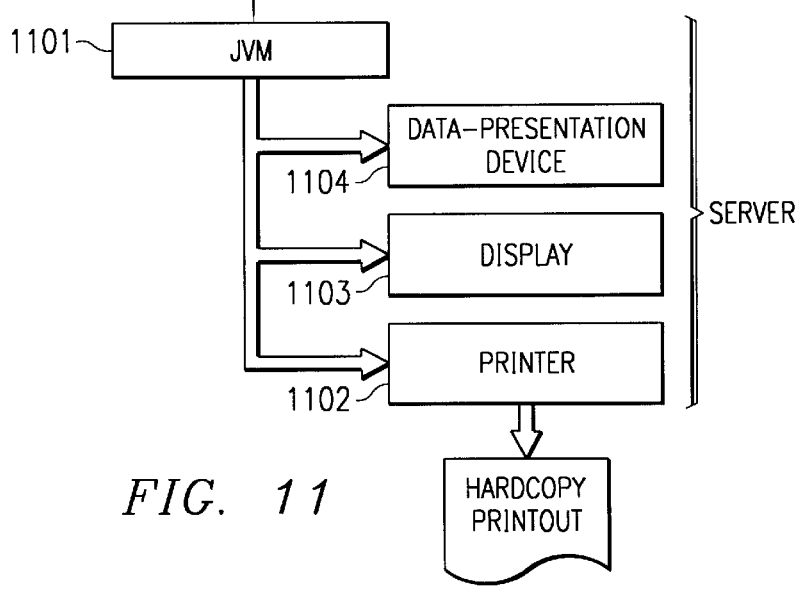
FIG. 8 is a flowchart depicting the process of generating an executable data-presentation job file.

With reference now to FIG. 8, a flowchart depicts the process of generating an executable print job file from the perspective of the executable print job generator. The process starts (step 800) when JDK application 411 initiates a print job (step 810). This step is similar to steps 610–630 previously described with respect to FIG. 6. In the Java environment, the print job may be initiated through the invocation of certain methods, such as getPrintJob ( ), etc. The use of method getPrintJob ( ) is merely an example of a method call within current implementations of Java, such as in the Java Development Kit (JDK).

Other method calls, which accomplish an equivalent set up within the JVM 401, may be used if available. JVM 401 will create the necessary data structures to accomplish the print job through the execution of various methods within JVM output device sub-system 406, which includes executable print job generator 407. Executable print job generator initializes for the generation of the executable print job file (step 810). Executable print job generator 407 begins the process of creating an executable print job file by writing a header to an intermediate Java language file in preparation for the final compilation of a Java .class file (step 820). The header in the executable print job file contains those Java statements that provide for the set up of the Java .class file.

The process continues when executable print job generator 407 outputs executable code into the executable print job file for subsequent invocation of a AWT method during the execution of the print job in the output device subsystem (step 830). The executable code may be Java source code statements that mirror similar source code statements within JDK application 411. For each AWT method invocation generated by JDK application 411, single or multiple source code lines will be generated by executable print job generator 407 so that the AWT method will properly execute. This may include several support statements that set up parameters for the AWT calls. The number and syntax of these supporting source code lines depends on the AWT method being invoked.

The process continues with executable print job generator 407 writing a footer to the executable print job file (step 840). The footer and executable print job file contain those source code statements that provide for a complete Java .class file. Executable print job generator 407 then compiles the executable print job file (step 850), if necessary. These completion steps by executable print job generator 407 are similar to step 560 that was previously described with respect to the overall processing of the user print job request. The process then returns (step 860).

The example above mentions the generation and output of Java source code lines as the form of output for the generated executable code. However, the form of the output may consist of object code or even the binary values required to construct a Java .class file directly. The step of compiling the generated executable code then depends upon the form in which the final file should be generated. The final form of the spooled file may have been set as a parameter in the initial data-presentation job request by the user.

With reference now to FIG. 9, an example is given of an intermediate Java source code file. Executable print job generator 407 generates the intermediate file as previously described with respect to FIG. 8. As can be seen, the intermediate file contains a header section at the beginning of the file that provides set up statements that were generated by executable print job generator 407 during step 820. The intermediate file also contains a footer section that provides the majority of the source code required to build a complete Java .class file. The particular statements included in either the header or footer may depend on the complexity of the graphics or content of the print job. The footer may also include other statements that provide for variations in the output of the print job. These variations may have been previously selected or specified by a user in output device dialogues 403, such as the specification of the quality of the final hard copy output. One of ordinary skill in the art would understand that the Java statements in the example of FIG. 9 may be expanded to include multiple processing options that provide for more sophisticated print job output.

The intermediate Java source code file also includes statements that were generated by invocation of AWT methods by JDK application 411. These statements appear between the header section and the footer section of the intermediate Java source code file. In the example of FIG. 9, these statements include setColor ( ) and drawRect ( ) method invocations. The example source code statements found in FIG. 9 can be traced to their origin in JDK application 411, an example of which is shown in FIG. 7. FIG. 7 contains a section that contains source code statements for a setColor ( ) invocation and a drawRect ( ) invocation identical to the source code statements found in the example of FIG. 9.

With reference now to FIGS. 10A and 10B, examples of Java AWT calls are provided that may be outputted in the executable print job file generated in response to a user print job request.

Figure 11:
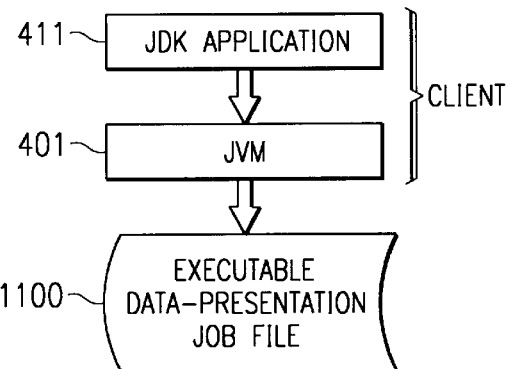
FIG. 11 is a simplified block diagram that depicts the data flow during the processing of a data-presentation job request.

With reference now to FIG. 11, a simplified block diagram depicts the data flow during the processing of a print job request. A source of the print job is shown as a client, and a destination of the print job is shown as a server. Actual hardware and software configurations for the origin and destination of the print job, may vary depending upon the user's computing environment. In this example, the origination may be client 108 and the destination may be server 104 located on network 102 within distributed data processing system 100.

JDK application 411 initiates a print job, which is generated in JVM 401, which may include a software component similar to executable print job generator 407 or executable data-presentation job generator 407. JVM 401 generates executable print job file 1100, such as a Java class file, and may temporarily store this file on client 108. Eventually, JVM 401 transmits executable data-presentation job file 1100 to JVM 1101 located on server 104. Upon receiving the executable print job file, JVM 1101 executes the file in order to produce hardcopy output on printer 1102. Depending upon the demands of the server 104, it may be necessary for JVM 1101 to queue the execution of the print job file until adequate printing resources are available. Alternatively, JVM 1101 executes the executable data-presentation file to produce output on display 1103 or data-presentation device 1104.

One of ordinary skill in the art would understand that JVM 401 and JVM 1101 may be a single instance of a virtual machine executing on a single stand-alone computer system. The example in FIG. 11 merely provides a description of the process completion of a print job within a distributed data processing system. In the stand alone case, JVM 401 and JVM 1101 may be a single instance on data processing system 300. In another example, printer hardware 102 may be connected directly to client 108 so that executable print file 1100 does not require transmission across network 102. In a further example, server 104 and printer hardware 1102 (or display 1103 or data-presentation device 1104) may be a single hardware system if printer 1102 (or display 1103 or data-presentation device 1104) can function simultaneously as server 104.

JVM 1101 may also be an embedded virtual machine implemented in hardware, firmware, microcode, or read-only code stored in printer hardware 1102. A printer device enabled with such a virtual machine would provide for easy portability and extensibility of support for print services required by Java applications. The fact that executable print file 1100 comprises compiled Java source code statements allows the print jobs to be easily transportable yet also be structured such that they may be quickly and efficiently executed on various computer platforms.

With reference now to FIGS. 12A and 12B, an example is given of the control flow and pseudocode of software that may reside in a virtual machine that receives an executable print file. For example, the code shown in FIGS. 12A and 12B may reside in JVM 1101, and the code executes in a manner that provides for the execution of executable print job file 1100.

Since metafiles do not exist in the Java computing environment, a Java .class file can be generated, which is a known-format that is able to execute on any Java virtual machine. The present invention saves the effort of creating a back-end subsystem that has to read the metafile data and call the API's. A Java class file is already executable and should require less storage and transmission bandwidth than transferring an entire Java print application to a printer subsystem.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a data-presentation job using a virtual machine in a data processing system, said method comprising the computer-implemented steps of:
   receiving a data-presentation job request from an application, wherein the data-presentation job includes data-presentation method calls;
   recording the data-presentation method calls as executable code, wherein the executable code includes at least one instruction not found in the application; and
   generating an executable data-presentation job file from the executable code, wherein the executable data-presentation job file is configured to directly present data when executed without a separate data file.

2. The method as recited in claim 1 wherein the virtual machine is a Java virtual machine, the executable code is Java source code statements, and the executable data-presentation job file is a Java .class file.

3. The method as recited in claim 1 wherein the executable code is object code.

4. The method as recited in claim 1 wherein the executable code is a set of source code statements, and wherein the step of generating an executable data-presentation job file comprises compiling the source code statements.

5. The method as recited in claim 1 further comprising executing the executable data-presentation job file to present data to a user using an output device.

6. The method as recited in claim 5 wherein the output device is a printer.

7. The method as recited in claim 5 wherein the output device is a display.

8. The method as recited in claim 1, further comprising spooling the executable data-presentation job file as a data-presentation job.

9. A method for processing a print job using a Java virtual machine in a data processing system, said method comprising the computer-implemented steps of:
   receiving a print job request from an application, wherein the print job request includes graphics-related method calls;
   recording the graphics-related method calls as Java source code statements, wherein the Java source code statements include at least one statement not found in the application; and
   compiling the Java source code statements as a Java class file, wherein the Java class file is configured to directly print when executed without a separate data file.

10. The method as recited in claim 9, further comprising spooling the Java class file as a print job.

11. A computer program product for use with a data processing system for processing a print job using a Java virtual machine in the data processing system, said computer program product comprising:
   a computer usable medium;
   first instructions for receiving a print job request from an application, wherein the print job request includes graphics-related method calls;
   second instructions for recording the graphics-related method calls as Java source code statements, wherein the Java source code statements include at least one statement not found in the application; and
   third instructions for compiling the Java source code statements as a Java class file, wherein the Java class file is configured to directly print when executed without a separate data file.

12. A computer program product for use with a data processing system for processing a data-presentation job using a virtual machine in the data processing system, said computer program product comprising:
   first instructions for receiving a data-presentation job request from an application, wherein the data-presentation job includes data-presentation method calls;
   second instructions for recording the data-presentation method calls as executable code, wherein the executable code includes at least one instruction not found in the application; and
   third instructions for generating an executable data-presentation job file from the executable code, wherein the executable data-presentation job file is configured to directly present data when executed without a separate data file.

13. The computer program product as recited in claim 12 wherein the virtual machine is a Java virtual machine, the executable code is Java source code statements, and the executable data-presentation job file is a Java class file.

14. The computer program product as recited in claim 12 wherein the executable code is object code.

15. The computer program product as recited in claim 12 wherein the executable code is a set of source code statements, and wherein the instructions for generating an executable data-presentation job file comprises instructions for compiling the source code statements.

16. The computer program product as recited in claim 12 further comprising instructions for executing the executable data-presentation job file to present data to a user using an output device.

17. A data processing system for processing a print job using a Java virtual machine, said data processing system comprising:

receipt means for receiving a print job request from an application, wherein the print job request includes graphics-related method calls;

recordation means for recording the graphics-related method calls as Java source code statements, wherein the Java source code statements include at least one statement not found in the application; and compilation means for compiling the Java source code statements as a Java class file, wherein the Java class file is configured to directly print when executed without a separate data file.

18. The data processing system as recited in claim 17, further comprising spooling means for spooling the Java class file as a print job.

19. A data processing system for processing a data-presentation job using a virtual machine, said data processing system comprising:

receipt means for receiving a data-presentation job request from an application, wherein the data-presentation job includes data-presentation method calls;

recordation means for recording the data-presentation method calls as executable code, wherein the executable code includes at least one instruction not found in the application; and generation means for generating an executable data-presentation job file from the executable code, wherein the executable data-presentation job file is configured to directly present data when executed without a sedarate data file.

20. The data processing system as recited in claim 19 wherein the virtual machine is a Java virtual machine, the executable code is Java source code statements, and the executable data-presentation job file is a Java class file.

21. The data processing system as recited in claim 19 wherein the executable code is object code.

22. The data processing system as recited in claim 19 wherein the executable code is a set of source code statements, and wherein the generation means for generating an executable data-presentation job file comprises compilation means for compiling the source code statements.

23. The data processing system as recited in claim 19 further comprising execution means for executing the executable data-presentation job file to present data to a user using an output device.

24. The data processing system as recited in claim 19, further comprising spooling means for spooling the executable data-presentation job file as a data-presentation job.

* * * * *